US005640212A

United States Patent [19]
Baccarini

[11] Patent Number: 5,640,212
[45] Date of Patent: Jun. 17, 1997

[54] VIDEO SIGNAL CLIPPING CIRCUITRY AND METHOD FOR COLOR TELEVISION BROADCASTING

[75] Inventor: Maurizio Pasquino Baccarini, Cherry Hill, N.J.

[73] Assignee: General Instrument Corporation of Delware, Hatboro, Pa.

[21] Appl. No.: 591,716

[22] Filed: Jan. 25, 1996

[51] Int. Cl.[6] .................................................. H04N 5/16
[52] U.S. Cl. ........................ 348/671; 348/690; 348/707
[58] Field of Search ................................. 348/671, 707, 348/690, 691, 698; H04N 5/18, 5/14, 5/16

[56] References Cited

U.S. PATENT DOCUMENTS

| | | | |
|---|---|---|---|
| 4,306,256 | 12/1981 | Christopher | 348/690 |
| 4,612,576 | 9/1986 | Hinn | 348/691 |
| 5,471,244 | 11/1995 | Wolfe | 348/691 |

OTHER PUBLICATIONS

"Differential Gain, Differential Phase, Chrominance-to-Luminance Delay", By Rex Bullinger, pp. 58–70 in the Sep. 1994 issue of Communications Technology.

Primary Examiner—Sherrie Hsia
Attorney, Agent, or Firm—Irwin Ostroff; Edward Brandeau

[57] ABSTRACT

Cost effective video clipping circuitry and method achieve lower distortion color television broadcasting. Excess "white" level voltage peaks in otherwise standard (e.g., that of the National Television Standards Committee) color line video signals are clipped by a unique arrangement to prevent over-modulation of an RF broadcast carrier. The circuitry includes amplifier circuitry for substantially amplifying a line video signal above standard levels, diode clipping circuitry for clipping excess white levels from the signal after it has been amplified thereby reducing distortion otherwise caused by an inherent non-linear initial conduction characteristic of the diode clipping circuitry, and attenuator circuitry for attenuating to standard levels the signal after clipping so as to obtain reduced luminance and chrominance distortion.

18 Claims, 3 Drawing Sheets

VIDEO SIGNAL CLIPPING CIRCUITRY AND METHOD FOR COLOR TELEVISION BROADCASTING

FIELD OF THE INVENTION

The present invention relates to an improved signal clipping circuitry and method which is both efficient and cost effective yet produces a significantly lower level of residual distortion than prior circuits when limiting over-modulation of a radio-frequency television carrier by color video signals.

BACKGROUND OF THE INVENTION

In the United States television programs are broadcast on assigned channels by means of amplitude-modulated radio frequency (RF) carriers. The frequency of each carrier is the frequency assigned by the Government to a respective channel. Television programs are broadcast in accordance with the rules and regulations established by the Federal Communications Commission (FCC) and must also comply with the technical standards set by the National Television Standards Committee (NTSC). Thus a number of stringent requirements, both legal and technical, must be met by commercial television broadcasters.

Practically all television programs at the present time are broadcast in color. Previously, when there was only black and white broadcasting it was not necessary to deal with additional technical complications resulting from adding color information to the video picture signals being broadcast. Picture information in a color TV broadcast is contained in both the "luminance" and the "chrominance" portions of the video signals. At any pixel location of a picture being displayed on a TV screen, the brightness of the image and its color (red, green, or blue) are simultaneously derived from the luminance and chrominance portions of the signal. This mode of operation is well known in the art and need not be discussed further herein.

Distortion of the luminance portion of a TV signal usually results also in improper color reproduction of an image when it is subsequently displayed on a TV screen. The human eye is very sensitive to false renditions of colors, improper bleeding of one color into another, color streaks, etc. It is therefore highly desirable, in order to assure consistently high quality picture reproduction, that the luminance and chrominance portions of a color TV signal have their phases and amplitudes within the specifications set by NTSC standards and FCC regulations.

There are over 10,000 cable television (CATV) systems in operation in the United States, each distributing TV programs to subscribers via a respective cable network. Each network, by its nature, is local or geographically limited in extent. This however provides an important opportunity for local TV coverage of town or school events, for commercial advertisements of local goods or services, etc. It is usual therefore for a CATV operator to insert into regular programs, which are generally intended for viewers nationwide, programs of a local nature (ads, etc.) intended for viewing only by the subscribers of each particular CATV system. Frequently, these local programs are produced on a low budget, often using equipment and/or recording tapes which are of relatively low quality. Sometimes a locally produced program has video signal levels, which if inserted as-is into a regular program being broadcast over the CATV system would over-modulate the RF carrier of that respective TV channel. Over-modulation can cause severe distortion in TV pictures subsequently displayed on cable subscribers' TV sets. Excess white level peaks in a line video signal can also interfere with the proper functioning of TV picture scrambling, descrambling systems used by CATV operators. CATV operators have in the past "clipped" or electronically limited excess amplitude levels of the video signals at baseband before modulation of the RF carrier to limit distortion. Clipping was usually done with a conventional shunt diode circuit which selectively "clips" the signals above a certain level and thus limits amplitude of the video signal before it is used to modulate a carrier. However, as will be explained in detail hereinafter, the use of such conventional "clipping" circuits distorts the lower luminance portion of the video signal. This distortion in turn reacts with the chrominance portion of the signal to cause false colors, bleeding, streaking, etc., in the TV pictures when reproduced on a standard TV receiver.

In an effort to minimize the problems caused by "clipping", such as described above, the FCC recently issued Regulation #76,605 (a)(12) titled "Differential Gain" and Regulation #76,605 (a)(13) titled "Differential Phase". These regulations state: "As of Jun. 30, 1995, the following requirements apply to the performance of the cable television system as measured at the output of the modulating or processing equipment (generally the head end) of the system". The regulations then give definitions of "differential gain" and "differential phase", spell out specification limits not to be exceeded by these values, and give detailed instructions on how to measure differential gain and phase for the purposes of the regulations. These regulations are readily available from the FCC in Washington, D.C., and will not be discussed further. An article entitled "Differential gain, differential phase, chrominance-to-luminance delay", by Rex Bullinger, pages 58–70 in the September 1994 issue of *Communications Technology* also discusses testing and other technical matters relating to these FCC regulations.

If prior "clipper" circuits continue to be used, some CATV operators may be broadcasting signals that are out-of-compliance with the new FCC regulations. The reasons for this will be explained in detail hereinafter.

It is desirable to provide clipping circuitry and method, which meets the Jun. 30, 1995 distortion requirements of the FCC.

SUMMARY OF THE INVENTION

In accordance with the present invention, in one embodiment thereof, there is provided an improved circuitry for clipping excess "white" level voltage peaks in an otherwise standard (e.g., NTSC) line video signal to prevent over-modulation of an RF broadcast carrier by the video signal. The circuitry of the present reduces residual distortions in the luminance and chrominance portions of the video signal even after "clipping". As a result the modulated broadcast carrier and a subsequently demodulated video signal derived from the modulated carrier comply with strict FCC regulations and standards set thereby. The new circuitry comprises amplifier means coupled to receive a line video signal which complies with standards, such as those set by the NTSC, except for excess "white" level voltage peaks in the active video portion of the signal. The amplifier means, in an embodiment illustrated, is a differential amplifier whose amplification (gain) level and whose output "zero" level can be separately set at desired values. This differential amplifier, by way of example, amplifies the video signal applied to it by a substantial factor, such as 12 dB (a factor of 4). After the video signal has been amplified it is applied to a voltage clipping circuit and to attenuator means. By way of illustration, the voltage clipping circuit includes a diode (e.g., a Schottky diode) coupled through a low resistance circuit to a reference voltage which is typically Ground. The operational mode is such that the diode operates so that excess "white" levels in the amplified video signal are clipped and thereby eliminated. The attenuator means is a resistance network which attenuates the amplified and clipped video signal down to a level which meets the required standard. An output of the attenuator means is coupled to modulator means for modulating an RF carrier with the "clipped" video signal.

As is well known, a typical diode has a non-linear conduction region, often called a "knee", extending from a threshold voltage, where it first begins to conduct, to a higher voltage whereafter the diode shows a Generally linear voltage-current relationship. Where a signal with a peak voltage being "clipped" by the diode extends only a short way above the threshold voltage of the diode, the clipping action of the diode results in a certain amount of residual distortion in the signal being clipped. However, here, in accordance with the present invention, the line video signal is substantially amplified before it is clipped causing the peaks of the signal to extend well beyond the threshold voltage of the diode. Thus, by first amplifying and then clipping and attenuating the line video signal, residual distortions in luminance and chrominance portions of the signal are reduced. The "clipped" line video signal complies with the strict requirements of the new FCC regulations.

Viewed from one aspect, the present invention is directed to circuitry comprising amplifier means, voltage clipping means, and attenuator means. The amplifier means, which has an input and an output, amplifies line video signals applied to the input. The voltage clipping means, which has an input coupled to the output of the amplifier means, clips voltage levels of signals above a first preselected level that are received from the amplifier means. The attenuator means, which has an input coupled to the output of the amplifier means, attenuates the level of the line video signals therefrom to a second preselected level such that residual distortion in the line video signals after clipping is reduced. The second preselected level is lower than the first preselected level.

Viewed from one aspect, the present invention is directed to circuitry for clipping excess white levels of line video signals above a first preselected level. The circuitry comprises an amplifier and resistor-diode network means. The amplifier has a substantial gain factor and has an input and an output. The input is connectable to line video signals having white levels above the first preselected level. The resistor-diode network means, which has an input coupled to the output of the amplifier and has an output, clips amplified white levels above a second preselected level of the video signals from the amplifier, which level is greater than the first preselected level, and attenuates the clipped video signals to the first preselected level and applies same to the output such that clipped video signals suitable for modulating a radio frequency carrier with reduced distortion are obtained.

Viewed from one aspect, the present invention is directed to circuitry to clip "white" level voltage peaks in line video signals which are above a preselected level to prevent over-modulation of an RF broadcast carrier. The circuitry comprises amplifier means, diode clipping means, and attenuator means. The amplifier means substantially amplifies a line video signal. The diode clipping means, which comprises a diode, clips white level voltage peaks from the line video signal after same has been amplified by the amplifier means. The attenuator means attenuates the amplified line video signal after same has been clipped of voltage peaks such that residual distortion otherwise caused by an inherent non-linear initial conduction characteristic of the diode clipping means is reduced.

Viewed from another aspect, the present invention is directed to a method for removing level peaks above a first preselected level in line video signals so as to reduce residual distortion. The method comprises a first step of amplifying line video signals; a second step of clipping level peaks of the amplified line video signals above a second preselected level which is greater than the first preselected level; and a third step of attenuating the clipped and amplified line video signals to the first preselected level.

The invention will be better understood from the following more detailed description taken in connection with the accompanying drawings.

DETAILED DESCRIPTION

Figure 1:
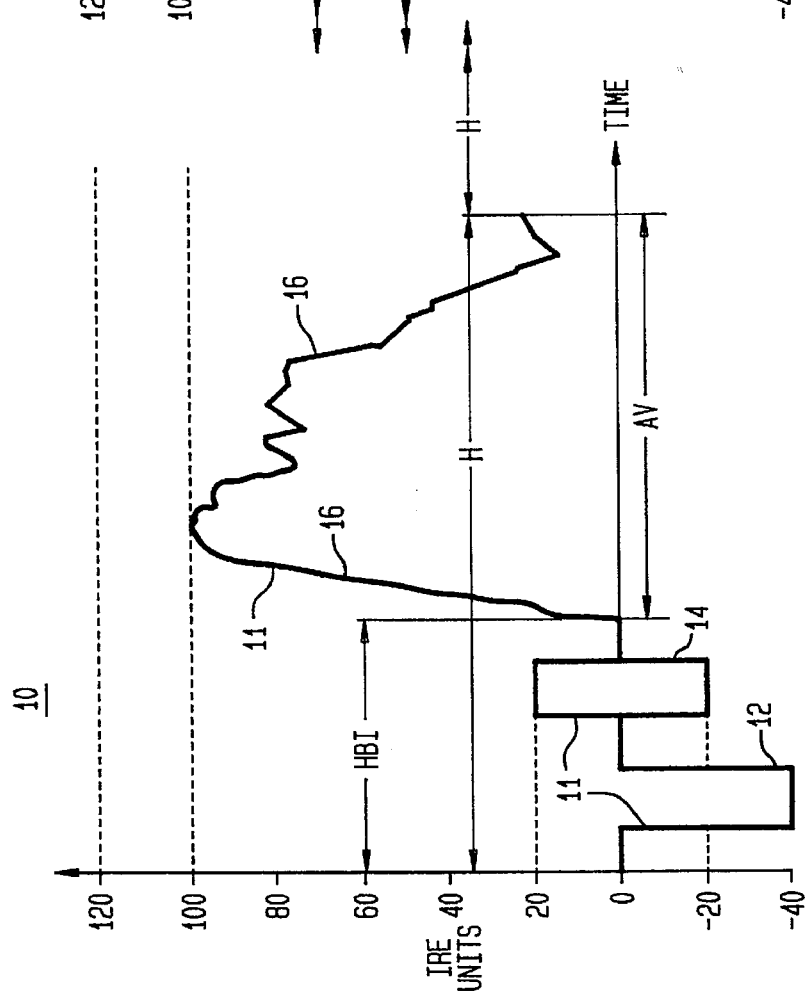
FIG. 1 is a schematic illustration of one horizontal line of a line video signal in accordance with NTSC standards.

Referring now to FIG. 1, there is shown a graph 10, with IRE units on the y-axis and TIME on the x-axis, of a composite wave form 11 which comprises a horizontal line H having a time period of H which comprises a first time period Horizontal Blanking Interval (HBI) in which a horizontal synchronizing (sync) pulse 12 and a high frequency color burst synchronizing signal 14 occur, and a second time period Active Video (AV) in which a video signal 16 occur. The horizontal video line H is shown at baseband and in accordance with NTSC standards. A television picture comprises a number (e.g., 525) of interlaced horizontal lines H organized into odd and even fields of each successive frame, as is well known. During the AV time period the video signal voltage 16 provides picture luminance, with "0" IRE representing a blanking level (dark) and +100 IRE representing maximum brightness (reference white). The sync pulse 12 has a negative amplitude from "0" IRE to −40 IRE. The color burst synchronizing signal has an amplitude varying between +20 and −20 IRE. It should be noted that a one volt peak-to-peak signal represents 140 IRE units as defined by the Institute of Radio Engineers. Thus, the 0 to +100 IRE units within which the luminance signal voltage 16 lies equals 714 millivolts, and the 0 to −40 IRE units of the sync pulse 12 equals 286 millivolts. Detailed descriptions of a video line H with its synchronizing pulse, color burst signal, and active video (AV), and of color television broadcasting in general, with standards such as the NTSC etc., are found in a book entitled *BASIC TELEVISION AND VIDEO SYSTEMS*, Fifth Edition, by Bernard Grob, McGraw-Hill Book Company, 1984.

Figure 2:
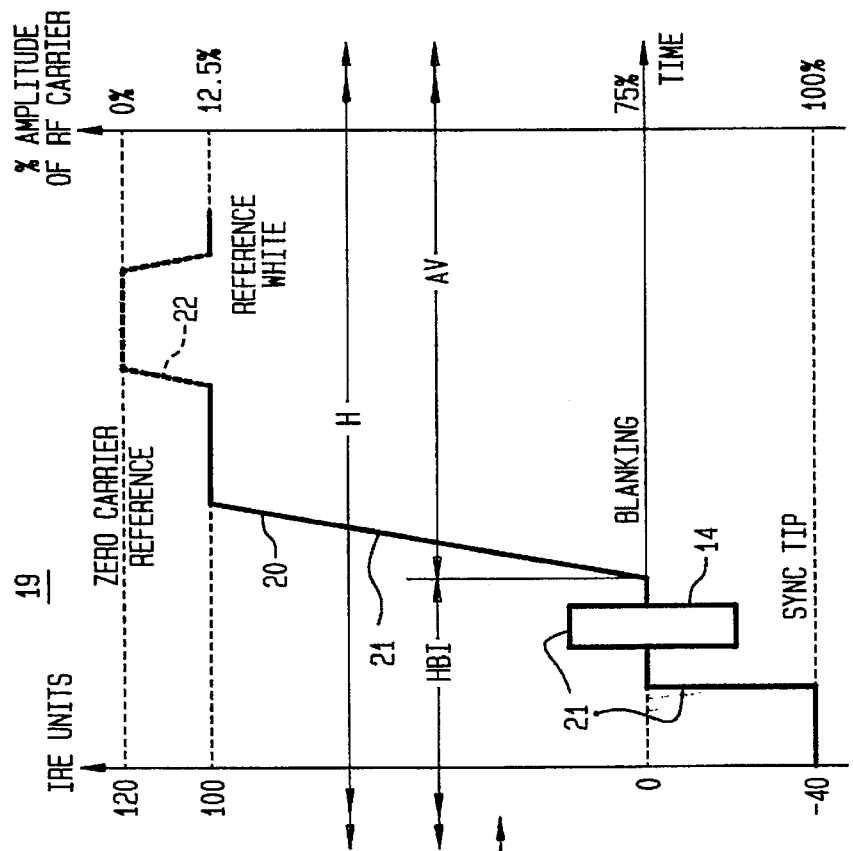
FIG. 2 is a schematic illustration of portions of a horizontal line of a standard video signal showing relative voltage levels and corresponding percentages of amplitude of a modulated RF carrier.

Referring now to FIG. 2, there is shown a graph 19, with IRE units on the y-axis to the left, Percentage (%) Amplitude of RF Carrier (0% at the top to 100% at the bottom) on the y-axis to the right, and TIME on the x-axis, of a portion of a composite wave form 21 which is similar to composite wave form 11 of FIG. 1 but is only shown during portions of HBI and AV time periods. Wave form 21 illustrates only part of a video line H showing an ending part of the HBI time period and a beginning part of the AV time period. Percentages of maximum amplitude of an RF carrier (not shown) as modulated by the video line H are shown on the right vertical (y-axis) scale. Wave 21 comprises a portion of the sync pulse 12 (also see also FIG. 1) and the color burst signal 14 (also see FIG. 1), and a portion of a video signal voltage 20 (similar to the voltage 16 of FIG. 1) but having a portion 22 thereof (shown in dashed lines) that extends above 100 IRE Units. The IRE levels −40, 0, 100, and 120 correspond to those in FIG. 1. The tip of the sync pulse lies 12 at −40 IRE units. When a line H of the video signal at standard level modulates an RF carrier for broadcasting (as is well known), the −40 IRE level shown here results in 100% or maximum amplitude of the RF carrier. Conversely, at +120 IRE units the carrier amplitude is reduced to zero (0%), a condition which it is important to avoid as this entails loss of the television broadcast signal and consequent synchronizing and other problems. The level of zero (0) IRE represents the "blanking" level (dark or black) of a screen of a standard TV receiver and corresponds to a 75% carrier amplitude.

The maximum amplitude of the active video (AV) signal voltage 20 is specified by the NTSC to be 100 IRE units and this level represents maximum brightness, termed "reference white". This corresponds to 12.5% carrier amplitude and may be denoted hereinafter as a first or second preselected level. Levels above this level may be denoted hereinafter as a second or first preselected level. If the AV signal voltage 20 exceeds 100 IRE, as indicated by a dotted line portion 22, it must be "clipped" back to 100 IRE otherwise objectionable distortion in the TV signal as broadcast can result. Prior art circuits for clipping voltage peaks above 100 IRE themselves often caused some distortion.

Figure 3:
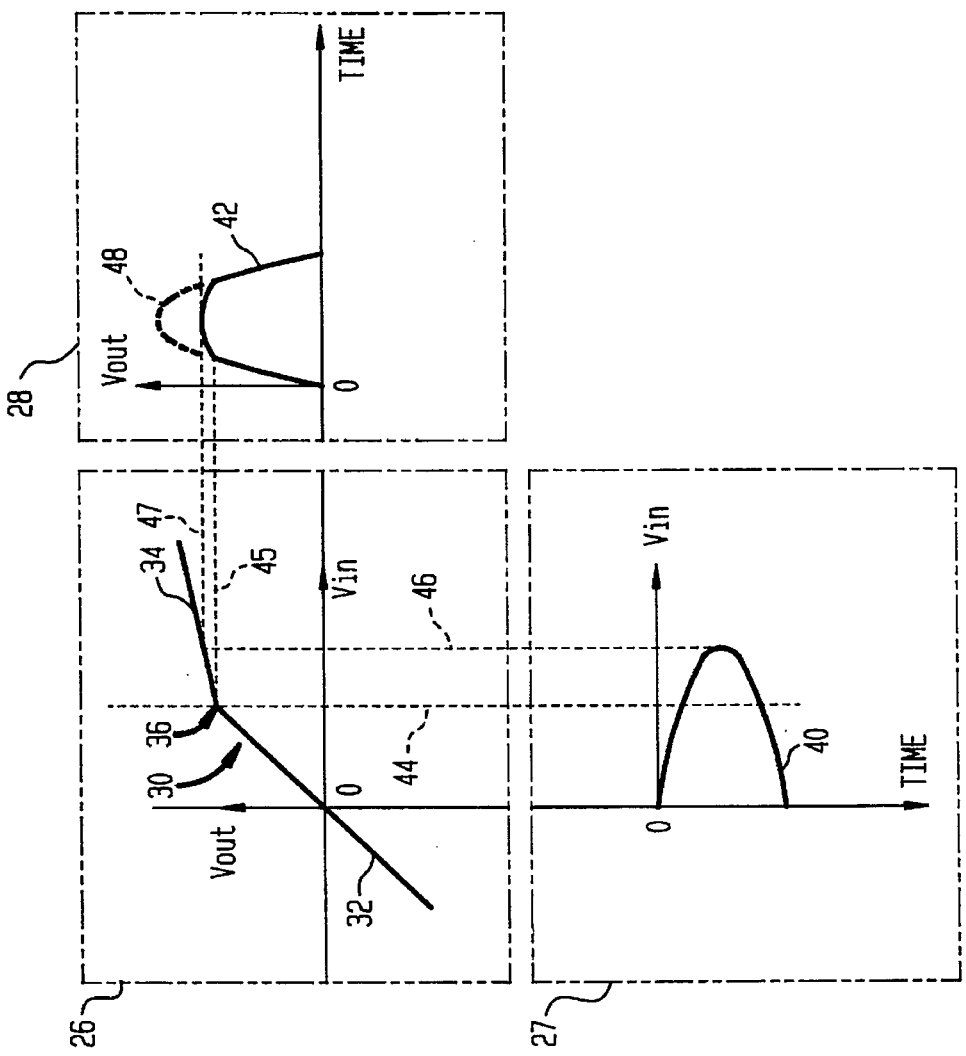
FIG. 3 graphically shows a transfer function of a clipping circuit illustrating how a positive peak of an input voltage is clipped to provide an output voltage with a reduced positive peak voltage.

Referring now to FIG. 3, there is shown a graph 26 (shown within a dashed line rectangle) of a transfer function (curve) 30, a graph 27 of an input voltage wave 40, and a graph 28 of an output voltage wave 42. Graph 26 has a voltage Vout on a y-axis and a voltage Vin along an x-axis and illustrates the transfer function curve 30 of a voltage clipping circuit (not shown here but described in detail hereinafter). A "transfer function" relates an output voltage obtained from a circuit to an input voltage applied to the circuit, as is well known. Graph 27, which for the sake of showing how it is related to graphs 26 and 28, is rotated 90 degrees clockwise, has Vin on an x-axis and Time on a y-axis and shows the input voltage wave 40. Graph 28 has Vout on a y-axis and Time on an x-axis and shows the output voltage wave 42. The transfer function (curve) 30 is here shown with a first straight-line segment 32 having a first slope (e.g., here 45°) and a second straight-line segment 34 (having a second much lower slope) meeting at adjacent ends at a "knee" 36. The significance of the knee 36 will be explained shortly. The vertical dashed lines 44 and 46 between graphs 26 and 27 indicate portions of the transfer curve 30 which control how the intersected portion of wave 40 (the input voltage wave) of graph 27 is transformed into wave 42 (the output voltage wave) of graph 28.

As the voltage wave 40 of graph 27 increases in amplitude from zero, a corresponding voltage is "transferred" along the line segment 32 in graph 26 as the output voltage wave 42 in graph 28. When the input voltage wave 40 reaches the level of the knee 36, indicated by a vertical dashed line 44 and a horizontal dashed line 45, further increases in the voltage wave 40 up to its peak level, indicated by a vertical dashed line 46, will be "transferred" over the knee 36 and along the line segment 34 of the transfer function 30. The corresponding output voltage wave 42 in graph 28 is thus limited to a peak level of Vout as indicated by a horizontal dashed line 47 between graphs 26 and 28. That portion of the input voltage wave 40 in graph 27 which has been thus "clipped" by the transfer function 30 is indicated by a voltage peak 48 shown in dashed outline in graph 28.

Though the knee 36 of the transfer function 30 is shown schematically in graph 26 as being relatively sharp, it is in fact "rounded" and extends somewhat beyond a threshold voltage of a clipping diode, as will shortly be explained. It is important, in reducing residual distortion in a clipped signal voltage, that a distorting effect of this knee 36 be lessened. It is noted that the peak of the voltage wave 40 in graph 27 extends well beyond the knee 36 in graph 26 as indicated by the vertical dashed lines 44 and 46.

Figure 4:
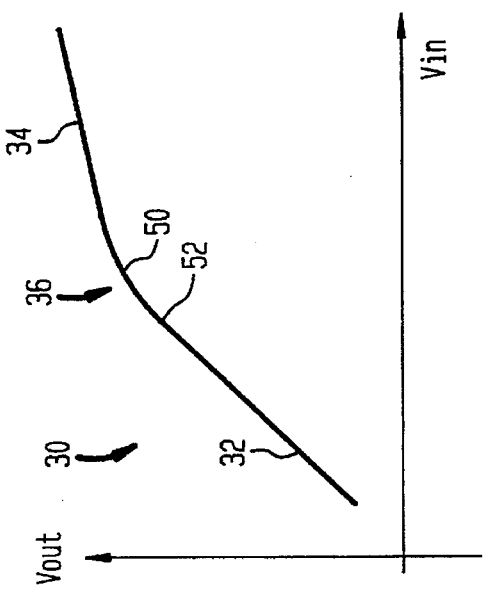
FIG. 4 is an enlarged portion of the transfer function of FIG. 3 showing a curved "knee" in it representing a diode as it begins to conduct above a threshold voltage.

Referring now to FIG. 4, there is shown an enlarged center portion of the transfer function 30 of graph 26 with voltage Vin along a horizontal scale and voltage Vout along a vertical scale. As seen here in FIG. 4, the knee 36 of the transfer function 30 is somewhat rounded (non-linear) and extends along a short curve 50 from the straight-line segment 32 at a voltage level indicated at 52 to the lower end of the straight-line segment 34. The voltage level 52 corresponds to a conduction threshold voltage of a diode in a voltage clipping circuit now to be described.

Figure 5:
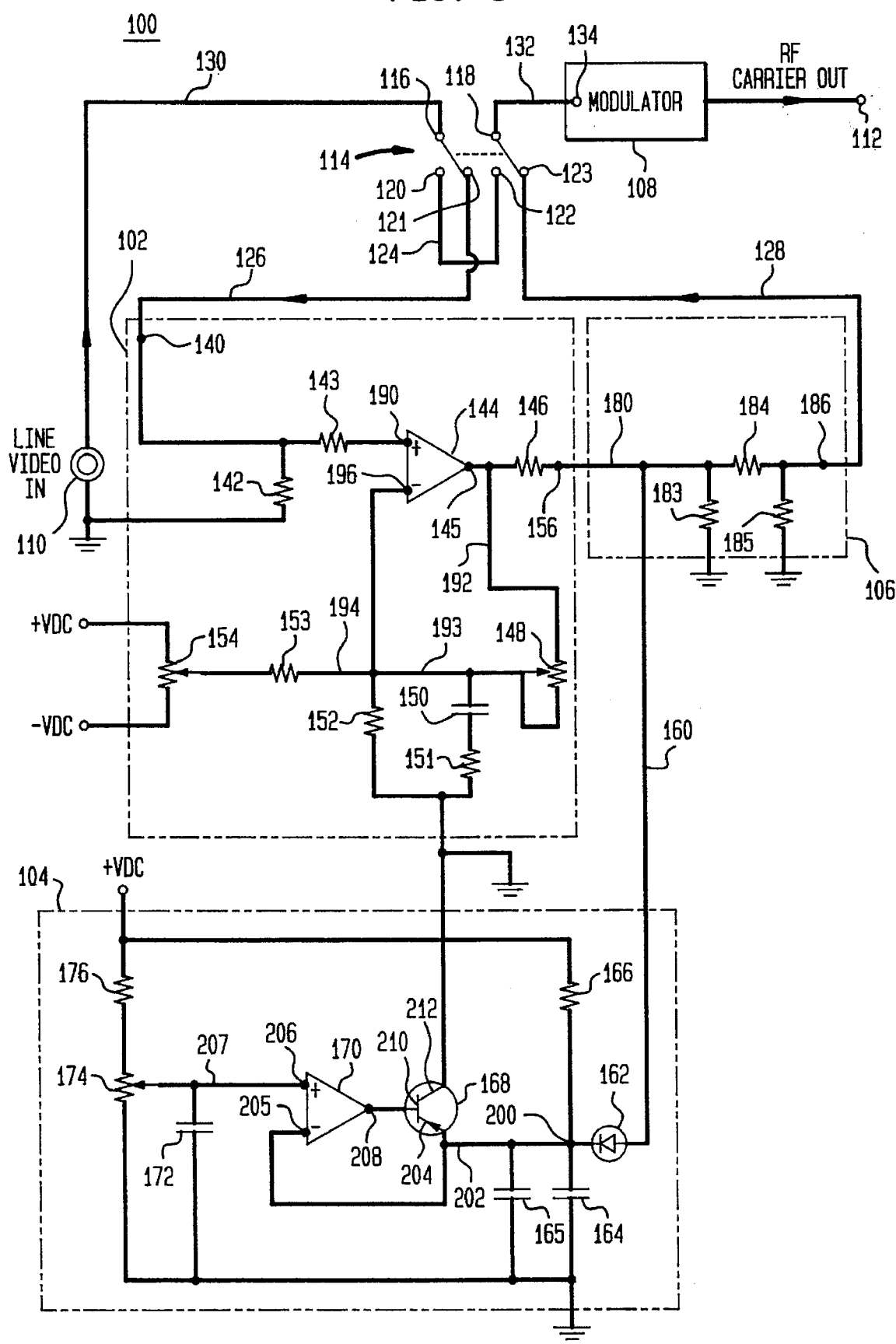
FIG. 5 is a schematic diagram of an illustrative circuitry embodying features of the invention.

Referring now to FIG. 5, there is shown a schematic diagram of an illustrative embodiment of an excess-peak video signal clipping circuitry 100 in accordance with the present invention. The circuitry 100 comprises amplifier circuitry (means) 102 (shown within a dashed line box), voltage clipping circuitry (means) 104 (shown within a dashed line box), attenuator circuitry (means) 106 (shown within a dashed line box), and RF modulator means (modulator) 108 (shown within a solid line box). The amplifier circuitry may be denoted as an amplifier. The voltage clipping circuitry and attenuator circuitry may be denoted as resistor-diode network means.

The circuitry 100 has an input 110 (LINE VIDEO IN), and an output 112 (RF CARRIER OUT), and a double pole, double throw switch 114. The switch 114 has two movable ganged-together contacts 116 and 118, and four stationary contacts 120, 121, 122, and 123. The contacts 120 and 122 are coupled together by a shunt 124. The contact 121 is coupled to a lead 126, and the contact 123 is coupled to a lead 128. The moveable contact 116 is coupled to a lead 130 which is coupled to the input 110, and the moveable contact 118 is coupled to a lead 132 which is coupled to an input 134 of the modulator means 108.

The amplifier circuitry 102 comprises an input 140 coupled to the lead 126, resistors 142 and 143, a differential amplifier 144 having an output 145, a resistor 146, a variable resistor 148, a capacitor 150, resistors 151, 152, and 153, a potentiometer 154, and an output 156 coupled to the resistor 146. Resistor 146 is used to adjust the output impedance of the amplifier 144 and also acts to attenuate the gain of amplifier circuitry 102. Positive and negative supply voltages +VDC and −VDC are supplied to the potentiometer 154 as shown. Resistor 153 and potentiometer 154 are used to compensate for DC offset in the amplifier.

The voltage clipping circuitry 104 comprises an input lead 160, a diode 162, a capacitor 164, a capacitor 165, a resistor 166, a p-n-p transistor 168, a differential amplifier 170, a capacitor 172, a potentiometer 174, and a resistor 176. Positive supply voltage +VDC is coupled to upper ends of the resistors 176 and 166 as shown.

The attenuator circuitry 106 is coupled via an input lead 180 to the output 156 of the amplifier circuitry 102. The attenuator circuitry 106 comprises resistors 183, 184 and 185, and an output 186 coupled to the lead 128.

A line video signal, like the video line H of FIG. 1 but with white level "peaks" above 100 IRE which should be clipped, is applied to the input 110 of the circuitry 100. The signal at the input 110 passes via the lead 130 through the contact 116 and the contact 121 of the switch 114, to the lead 126 and thence to the input 140 of the amplifier circuitry 102. The signal then passes along resistors 142 and 143 to an upper, positive (+) input 190 of the differential amplifier 144. The output 145 of the differential amplifier 144 is coupled in a feedback loop comprising a lead 192, the variable resistor 148, a lead 193 and a lead 194 to a lower, negative (−) input 196 of the differential amplifier 144. By setting the value of the variable resistor 148, the gain of the differential amplifier can be precisely adjusted. The output reference zero level of the differential amplifier 144 is adjustable by a D.C. voltage applied to the lead 194 by the resistor 153 and the potentiometer 154. The capacitor 150 and the resistor 151 act as a high frequency filter on the lead 193. The gain of the amplifier circuitry 102 from the input 140 to the output 145 is a substantial amount (e.g., 12 dB).

The input lead 160 to the clipping circuitry 104 is coupled to an anode of the diode 162. A cathode of the diode 162 is coupled to a node 200 to which are also coupled the lower end of the resistor 166, the upper end of the filter capacitors 164 and 165, and a common lead 202. The lead 202 is coupled to an emitter 204 of the transistor 168 and to a lower, negative (−) input 205 of the differential amplifier 170. An upper, positive (+) input 206 of the differential amplifier 170 is coupled via a lead 207 to the potentiometer 174. An output 208 of the differential amplifier 170 is coupled to a base 210 of the transistor 168. A collector 212 of the transistor 168 is coupled to a voltage reference terminal which is coupled to ground. The terms ground or grounded are used to mean a reference voltage including earth ground potential.

When the voltage on the input lead 160 to the clipping circuitry 104 becomes more positive than a bias voltage on the node 200 plus the threshold voltage of the diode, the diode 162 begins to conduct along a low resistance path to ground through the emitter 204 and collector 212 of the transistor 168. The bias voltage on the node 200 is set by adjustment of the potentiometer 174 and the servo action of the transistor 168 and the amplifier 170. When the voltage on the lead 160 is equal to one diode drop less or lower than the voltage on the node 200, the diode 162 is essentially non-conducting.

The resistor 146 of the amplifier circuitry 102 is coupled to the output 156 thereof and to the input lead 180 of the attenuator circuitry 106. Thus when the amplified signal becomes sufficiently positive, the voltage on the lead 180, and the lead 160, reaches a value at which the diode 162 begins to conduct and to limit (clip) the voltage appearing on the lead 160, and the lead 180, via a low resistance path through the emitter and collector of transistor 168 to ground. A "transfer function" (not shown) resulting from the operation of the amplifier circuitry 102 in conjunction with the clipping circuitry 104 and the attenuator circuitry 106 can be likened by analogy to the transfer function 30 illustrated in graph 26 of FIG. 3. The peak level of the clipped output voltage wave 42 indicated by the horizontal dashed line 47 in graph 27 of FIG. 3 may be thought of as analogous to a level of 100 IRE units illustrated in FIG. 1. The clipped signal appearing at the lead 180 is attenuated by resistors 183, 184, and 185 and appears as an output of the attenuator circuitry 106 at terminal 186. The signal at the output terminal 186 has a peak voltage level of approximately 100 IRE Units. The threshold voltage level 52 illustrated in FIG. 4 may be thought of as analogous to the bias voltage at the node 200 in the clipper circuitry 104, at which voltage the diode 162 begins to conduct. The diode 162 together with resistors coupled to the diode 162 may be thought of as resistor-diode network means for clipping and for attenuating amplified line video signals.

In an illustrative embodiment, +VDC=+12 volts, −VDC= −12 volts, the resistors in the attenuator circuitry 106 have the following values: resistor 183=225 ohms; resistor 184= 56 ohms and resistor 185=225 ohms; the resistors, variable resistors, and capacitor of the amplifier circuitry 102 have the following values: resistor 142=100 ohms, resistor 143= 100 ohms, resistor 145=75 ohms, variable resistor 148=5, 000 ohms, resistor 151=910 ohms, resistor 152=1000 ohms, resistor 153=100,000 ohms, resistor 154=50,000 ohms, and capacitor 150=10 pfs; and the resistors, variable resistors, and capacitors of the voltage clipping circuitry 104 have the following values: resistor 166=10,000 ohms, variable resistor (potentiometer) 174 =2,000 ohms, resistor 176=10,000 ohms, capacitor 164=0.15 uf, capacitor 165=100 uf, and capacitor 172=0.15 uf. The gain of the amplifier circuitry 102 and its zero bias level are adjusted by separately setting the variable resistor 148 and the potentiometer 154 so that signal levels of −40, 0, and 100 IRE units at the output 186 of the attenuator circuitry 106 substantially match corresponding IRE signal levels at the input 110 of the circuitry 100. The gain of amplifier 144 is about 12 dB at terminal 145 and the gain of amplifier circuitry 102 at terminal 156 is about 6 dB. By thus substantially amplifying the input line video signal applied to the input 110, excess level "white" peaks which are to be clipped, are magnified relative to the extent of the knee 36. Thus when the clipped line video signal is attenuated or reduced back to standard level, the distortion-causing effect of the knee 36 is correspondingly diminished and residual distortion in the signal at the output 186 is reduced.

The output 186 of the attenuator circuitry 106 is coupled to the lead 128, through the contacts 123 and 118, and the lead 132 to the input 134 of the modulator means 108. Modulator means 108 is a conventional modulator which modulates an RF carrier in a conventional manner to a standard IF frequency such as 45.75 MHz for NTSC. The output 112 of the modulator means 108 may, for example, be coupled to a CATV channel and coupled to a cable distribution network (not shown) of a CATV system.

The double pole, double throw switch 114 is provided for operational convenience. The switch 114 in the solid line position as shown of the moveable contacts 116 and 118, connects in-circuit the amplifier circuitry 102, the clipping circuitry 104 and the attenuator circuitry 106. In the opposite position (not shown) of the contacts 116 and 118 the input 110 of the circuitry 100 is coupled directly to the input 134 of the modulator means 108 and no clipping of an input line video signal takes place.

The above description of the invention is intended in illustration and not in limitation thereof. Various modifications or changes in the circuitry disclosed may occur to those skilled in the art and may be made without departing from the spirit and scope of the invention as set forth in the accompanying claims. For example, the invention is not limited solely to CATV broadcasting or to NTSC standards. Still further, the amount of amplifier gain, resistor and capacitor values, and diode type may be changed from those given by way of example in the above description. Furthermore, the switch 114 can be eliminated if the added convenience it provides is not needed.

What is claimed is:

1. Circuitry comprising:

amplifier means, which has an input and an output node, for substantially amplifying to a first preselected level line video signals applied to the input and having peak voltage levels to be clipped prior to modulating a radio frequency (RF) carrier;

voltage clipping means, which has an input coupled to the output node of the amplifier means, for clipping the peak voltage levels of the video signals above the first preselected level that are received from the amplifier means;

attenuator means, which has an input coupled to the output node of the amplifier means, for attenuating the level of the line video signals therefrom to a second preselected level prior to modulating the RF carrier such that residual distortion in the line video signals after clipping is reduced, and the second preselected level being lower than the first preselected level; and modulator means, which has an input coupled to an output of the attenuator means, for modulating the RF carrier with the line video signals received from the attenuator means.

2. The circuitry of claim 1 wherein the amplifier means comprises:

a differential amplifier having two inputs and an output;

means for applying the line video signals to a first of the inputs of the differential amplifier; and feedback means, which is coupled from the output of the differential amplifier to a second of the two inputs of the differential amplifier, for adjusting the gain of the differential amplifier.

3. The circuitry of claim 2 wherein the amplifier means further comprises bias means, which is coupled to the second input of the differential amplifier, for setting a zero reference level at the output of the differential amplifier.

4. The circuitry of claim 1 wherein the attenuator means comprises:

a resistance network of resistors having an output and having an input coupled to the output node of the amplifier means.

5. The circuitry of claim 1 wherein the voltage clipping means comprises:

a diode having an anode coupled to the output node of the amplifier means and having a cathode; and a low resistance electrical path coupled at a first end to the cathode of the diode and at a second end to a reference voltage terminal which is connectable to a reference voltage so that if the diode becomes forward biased the voltage of the node is clipped if same exceeds the first preselected level.

6. The circuitry of claim 5 wherein the voltage clipping means further comprises an amplifier having two inputs and an output with the first input being coupled to the cathode of the diode and to the first end of the low resistance electrical path.

7. The circuitry of claim 6 wherein the low resistance electrical path comprises the emitter-collector of a transistor.

8. The circuitry of claim 7 wherein the transistor is a p-n-p transistor having a base coupled to the output of the amplifier of the voltage clipping means, an emitter coupled to the cathode of the diode, and a collector coupled to the reference voltage terminal.

9. Circuitry for clipping excess white levels of line video signals above a first preselected level comprising:

an amplifier having a substantial gain factor and having an input and an output, the input being connectable to the line video signals having the white levels above the first preselected level, the amplifier amplifying the line video signals;

resistor-diode network means, which has an input coupled to the output of the amplifier and has an output, for clipping amplified white levels above a second preselected level of the video signals from the amplifier, which level is greater than the first preselected level, and for attenuating the clipped video signals to the first preselected level and applying same to the output such that clipped video signals suitable for modulating a radio frequency (RF) carrier with reduced distortion are obtained; and a modulator, which has an input coupled to the output of the resistor-diode network means, for modulating the RF carrier with the clipped line video signals.

10. The circuitry of claim 9 wherein the resistor-diode network means comprises:

a low resistance circuit in series with a diode, the circuit and diode being coupled in shunt between the output of the amplifier and a reference voltage terminal;

a plurality of resistors coupling the output of the amplifier to the output of the resistor-diode network means; and circuit bias means for biasing the diode to conduct when the second preselected level is exceeded.

11. The circuitry of claim 10 wherein the low resistance circuit comprises a transistor having a base electrode coupled to the circuit bias means, an emitter electrode coupled to one terminal of the diode, and a collector electrode coupled to the reference voltage terminal.

12. The circuitry of claim 9 wherein the gain factor of the amplifier is substantial, and the resistor-diode network means attenuates the amplified line video signals by an amount substantially equal in magnitude to the gain factor of the amplifier.

13. The circuitry of claim 9 wherein the line video signals have levels in excess of National Television Standards Committee (NTSC) standards and the clipped and attenuated line video signals have an upper level which is in accordance with the NTSC standards.

14. The circuitry of claim 13 wherein the gain factor of the amplifier is of the order of 6 dB, and the resistor-diode network means attenuates the amplified line video signals by an amount substantially equal in magnitude to the gain factor.

15. Circuitry to clip "white" level voltage peaks in color line video signals which are above a preselected level to prevent over-modulation of an RF broadcast carrier, the circuitry comprising:

amplifier means for substantially amplifying a line video signal;

diode clipping means, which comprises a diode, for clipping the white level voltage peaks from the line video signal after same has been amplified by the amplifier means;

attenuator means for attenuating the amplified line video signal after same has been clipped of voltage peaks such that residual distortion otherwise caused by an inherent nonlinear initial conduction characteristic of the diode clipping means is reduced; and modulator means, which has an input coupled to an output of the attenuator means, for modulating the RF carrier with the line video signal received from the attenuator means.

16. A method for removing level peaks above a first preselected level in color line video signals so as to reduce residual distortion comprising the steps of:

amplifying the color line video signals;

clipping the peaks of the amplified color line video signals above a second preselected level which is greater than the first preselected level;

attenuating the clipped and amplified color line video signals to the first preselected level; and modulating a radio frequency carrier with the clipped and attenuated color line video signals such that residual luminance and chrominance distortion is reduced.

17. The method of claim 16 wherein the step of clipping is by conduction of a diode, the diode being biased off below the second preselected level, and conducting above the second preselected level such that distortion resulting from inherent non-linear initial conduction characteristic of the diode is reduced.

18. The method of claim 16 wherein the color line video signals are amplified substantially and the first preselected level is in accordance with standards of the National Television standards committee.

* * * * *